(12) United States Patent
Lee (10) Patent No.: US 7,144,074 B2
(45) Date of Patent: Dec. 5, 2006

(54) MOUNTING STRUCTURE FOR BUMPER RAIL OF FRONT END MODULE CARRIER FOR VEHICLE

(75) Inventor: Kang Wook Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/006,700

(22) Filed: Dec. 8, 2004

(65) Prior Publication Data

US 2006/0033364 A1    Feb. 16, 2006

(30) Foreign Application Priority Data

Aug. 11, 2004    (KR) ............... 10-2004-0063225

(51) Int. Cl.
*B62D 25/08*    (2006.01)
*B60R 19/26*    (2006.01)

(52) U.S. Cl. ............ 296/203.02; 293/155; 293/187.09; 293/133; 403/2; 188/376

(58) Field of Classification Search ........... 296/193.09, 296/187.09, 203.02; 403/2; 188/376; 293/133, 293/155
See application file for complete search history.

(56) References Cited

U.S. PATENT DOCUMENTS 6,029,765 A * 2/2000 Chou et al. ................ 180/292

6,367,869 B1 * 4/2002 Baccouche et al. .... 296/187.09

OTHER PUBLICATIONS

U.S. Appl. No. 10/744,004, to AHN, which was filed on Dec. 24, 2003.

* cited by examiner

*Primary Examiner*—Dennis H. Pedder
(74) *Attorney, Agent, or Firm*—Greenblum & Bernstein, P.L.C.

(57) ABSTRACT

A mounting structure for a bumper rail of a front end module carrier for a vehicle includes an upper horizontal member that supports an upper portion of the carrier; a lower horizontal member that supports a lower portion of the carrier; left and right vertical members and that are formed with fastening holes and connect respective left and right sides of the upper and lower horizontal members to each other to support side portions of the carrier; and a bumper rail formed to be convexly curved forward and fixedly fastened to side rail members located at rear ends of the left and right vertical members and by bolts through the fastening holes. Each of the fastening holes includes a seating hole portion that receives and confines the bolt therein and a guide hole portion laterally extending from the seating hole portion.

1 Claim, 7 Drawing Sheets

Prior Art

FIG. 6

Prior Art

FIG. 7

Prior Art

MOUNTING STRUCTURE FOR BUMPER RAIL OF FRONT END MODULE CARRIER FOR VEHICLE

RELATED APPLICATIONS

The present disclosure relates to subject matter contained in Korean Application No. 10-2004-0063225, filed on Aug. 11, 2004, which is herein expressly incorporated by reference its entirely.

BACKGROUND OF THE INVENTION

1. Field of the Invention

The present invention relates to a mounting structure for a bumper rail of a front end module carrier for a vehicle, and more particularly, to a mounting structure for a bumper rail of a front end module carrier for a vehicle, wherein an impact transmitted to the front end module carrier through the bumper rail upon collision of the vehicle can be effectively absorbed to minimize damage to the front end module carrier.

2. Description of the Related Art

Generally, a cooling system including a radiator, a condenser, a fan and the like is placed at a front side of an engine room of a vehicle. Such apparatuses are mounted within the engine room in a production line.

However, in a case where the apparatuses are assembled separately, the numbers of parts and processes increase. Thus, there has been recently proposed a modularization technology in which a front panel (hereinafter, refers to as "carrier") constituting a front section of a body structure of the vehicle is produced as a single part and a radiator, a condenser, a fan and the like are then mounted on the front panel.

Front end module carriers are classified into a steel type, a resin type and a hybrid type with a mixture of steel and resin, according to their materials. In the steel type, since all members are made of steel, the front end module carrier has high strength but has a disadvantage of increased weight. Meanwhile, the resin type front end module carrier is light in weight but has a disadvantage of low strength. Therefore, in recent, the hybrid type carrier that is light in weight and can obtain strength beyond a certain level has been widely used.

Figure 5:
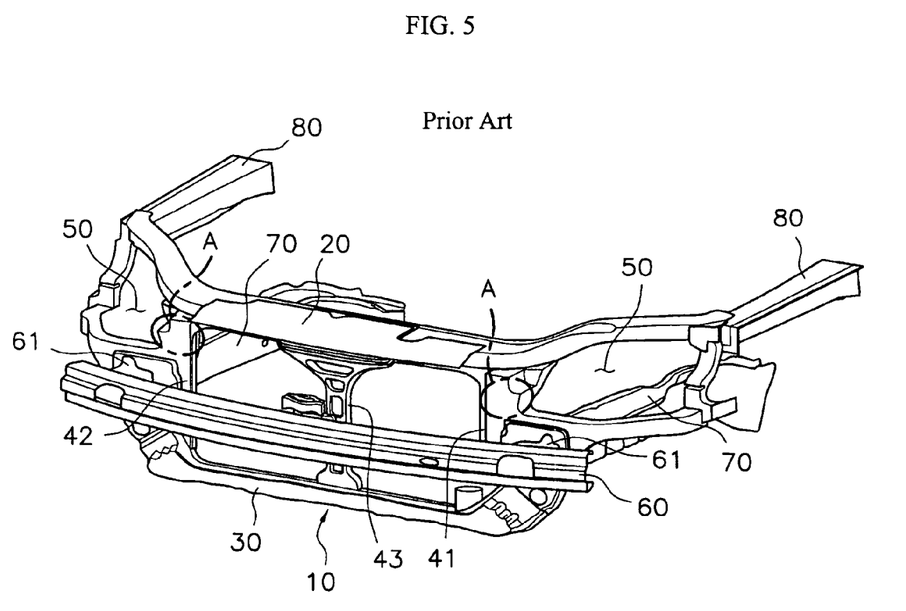
FIG. 5 is a perspective view showing a conventional front end module carrier.

FIG. 5 is a perspective view showing a conventional front end module carrier. In this figure, a carrier 10 comprises an upper horizontal member 20 for supporting an upper portion of the carrier; a lower horizontal member 30 for supporting a lower portion of the carrier; and left, right and central vertical members 41, 42 and 43 for supporting left, right and central portions of the upper and lower horizontal members 20 and 30.

The left and right vertical members 41 and 42 are provided, at respective sides thereof, with headlamp-mounting portions 50 on which headlamps can be mounted.

Meanwhile, a bumper rail 60 is provided in front of the left and right vertical members 41 and 42, and a bumper cover (not shown) is mounted in front of the bumper rail 60. The bumper rail 60 is formed to be gently curved forward so as to absorb an impact upon head-on collision of a vehicle.

Side rail members 70 are provided at rear ends of the left and right vertical members 41 and 42 to support the carrier 10.

Both ends of the upper horizontal member 20 are connected to front fender reinforcement members 80.

Figure 6:
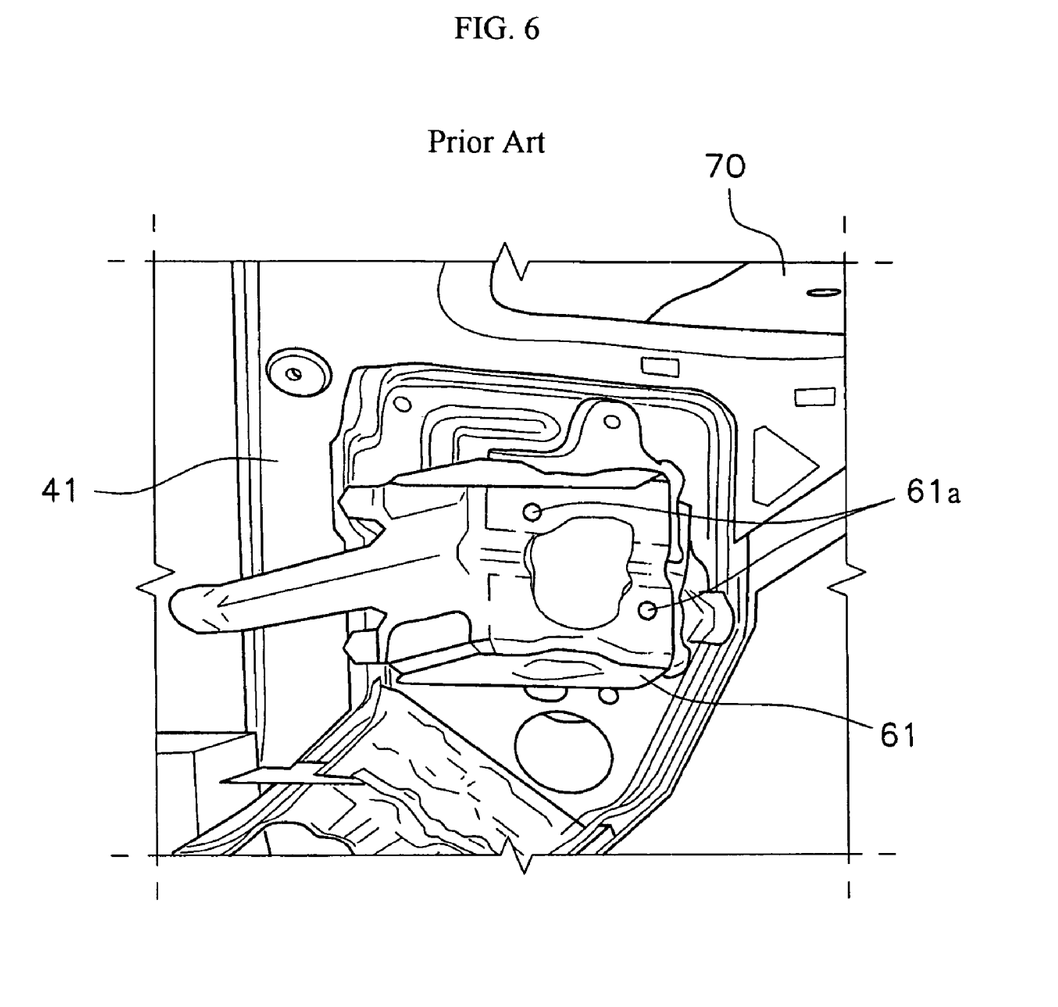
FIG. 6 is an enlarged view showing a portion of a left vertical member of the conventional front end module carrier.

FIG. 6 is an enlarged view showing a structure for fastening a bumper stay 61 to the left vertical member 41. The bumper rail (not shown) is firmly and fixedly mounted in front of the bumper stay 61, and bolt-fastening holes 61a are formed at a rear end of the bumper stay 61 so that the bumper stay can be fastened through bolts to the side rail member 70 as well as the left vertical member 41.

Even in the right vertical member, the bumper rail is fastened through bolts to the side rail member via the bumper stay in the same manner as described above.

However, the conventional mounting structure for the bumper rail of the front end module carrier has problems in that an impact applied to the bumper rail upon head-on collision of a vehicle is concentrated on the left and right vertical members, which is disadvantageous in impact absorption, and damage to the left and right vertical members of the front end module carrier becomes heavier.

Figure 7:
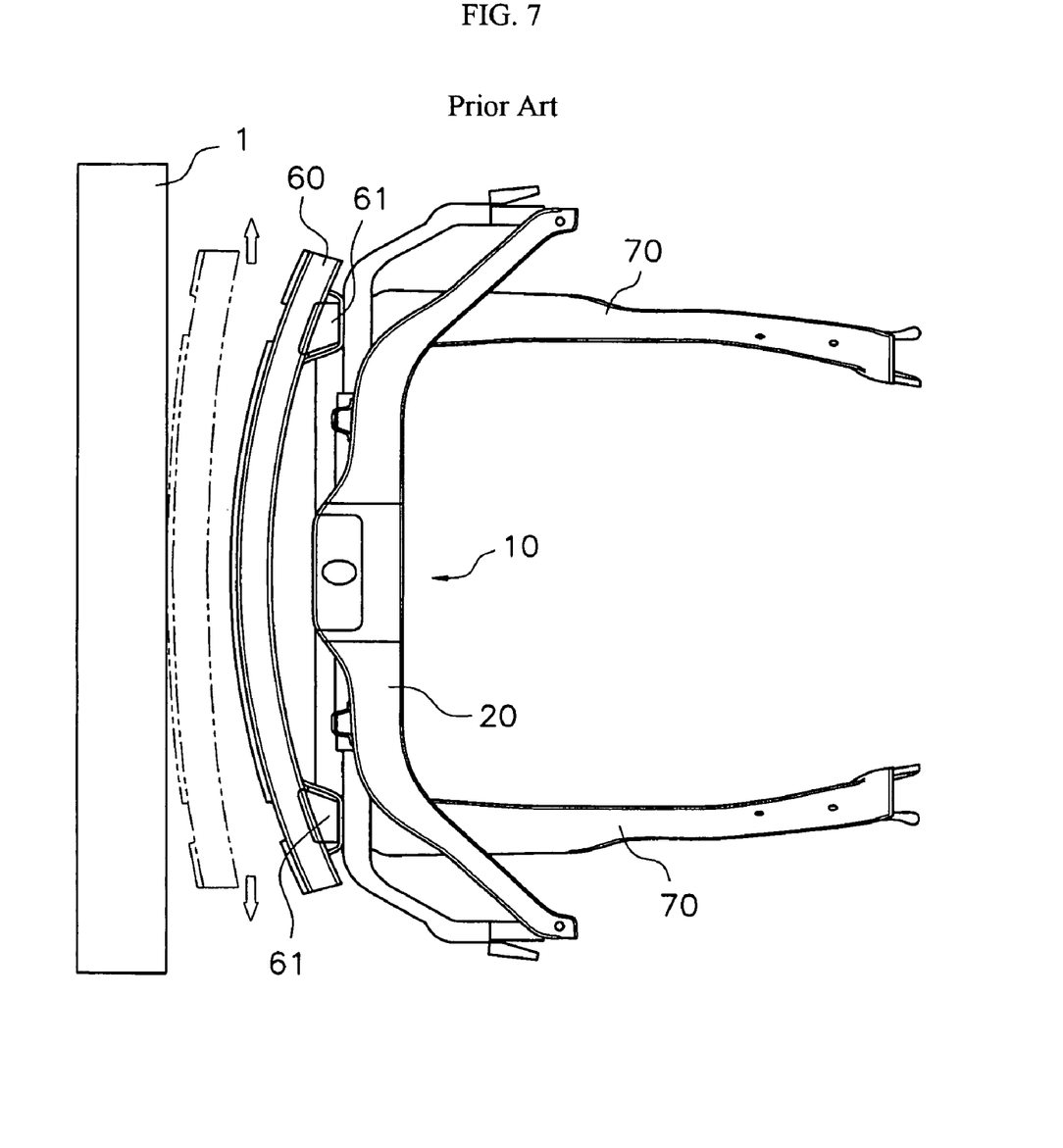
FIG. 7 is a view showing a state where the conventional front end module carrier is subjected to head-on collision.

FIG. 7 is a view showing changes in the shape of the bumper rail upon head-on collision of the conventional front end module carrier. The bumper rail 60 that was curved with a certain curvature prior to head-on collision is pushed rearward and elastically deformed to absorb an impact when the bumper rail is subjected to head-on collision against an obstacle 1. At this time, since both side portions of the bumper rail 60 have been firmly fixed to the carrier 10 through the bumper stay 61, they support the bumper rail 60.

Therefore, since a heavy load is concentrated locally on the carrier 10 to which the bumper stay 61 is fixed while the bumper rail 60 absorbs the impact, this structure has problems in that the capability of absorbing the impact is not sufficient and damage to the left and right vertical members of the front end module carrier becomes heavier.

Particularly, since the hybrid type front end module carrier is manufactured through an over-molding method by which the upper horizontal member and the left and right vertical members made of steel are covered with resin to be combined with one another, there is a problem in that portions (designated by "A" in FIG. 5) on which the left and right vertical members are located do not sufficiently withstand an impact applied to the bumper rail and thus easily broken.

SUMMARY OF THE INVENTION

The present invention is conceived to solve the aforementioned problems. An object of the present invention is to provide a mounting structure for a bumper rail of a front end module carrier, which can effectively absorb an impact transmitted through the bumper rail to the carrier upon collision thereof.

Particularly, an object of the present invention is to provide a mounting structure for a bumper rail of a conventional hybrid type front end module carrier, which can effectively absorb an impact transmitted through the bumper rail by reinforcing assembly rigidity of an upper horizontal member and left and right vertical members combined with one another using resin.

According to the present invention for achieving the objects, there is provided a mounting structure for a bumper rail of a front end module carrier for a vehicle, comprising an upper horizontal member that supports an upper portion of the carrier; a lower horizontal member that supports a lower portion of the carrier; left and right vertical members that are formed with fastening holes and connect respective left and right sides of the upper and lower horizontal members to each other to support side portions of the carrier, the left and right vertical members; and a bumper rail formed to be convexly curved forward and fixedly fastened to side rail members located at rear ends of the left and right vertical members by bolts through the fastening holes. Each of the fastening holes comprises a seating hole portion for receiving and confining the bolt therein and a guide hole portion laterally extending from the seating hole portion.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a preferred embodiment of the present invention will be described in detail with reference to accompanying drawings.

Figure 1:
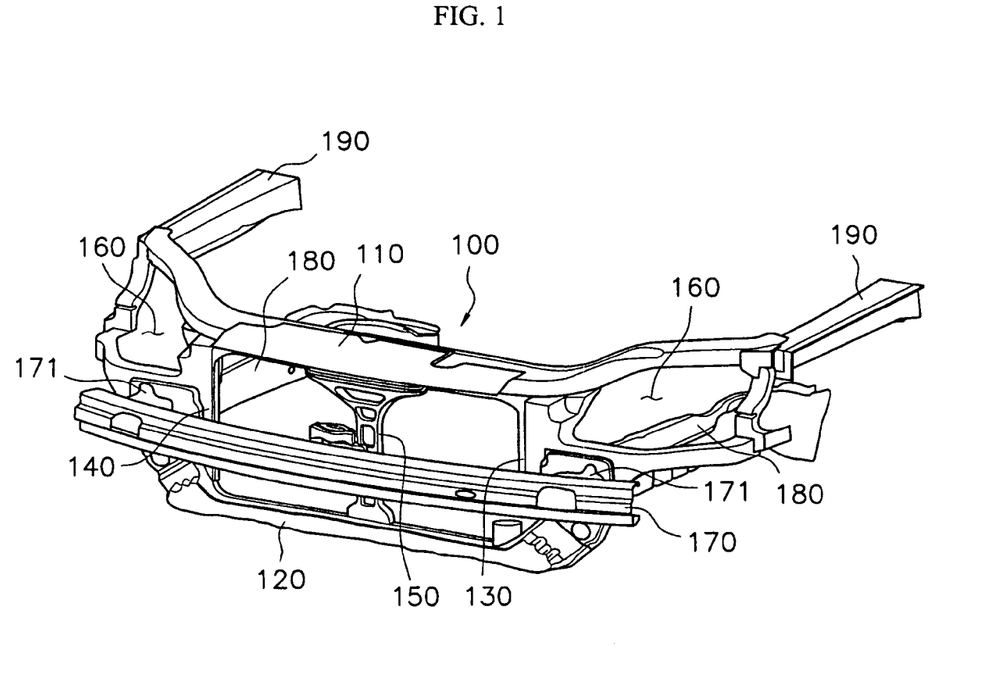
FIG. 1 is a perspective view showing a front end module carrier according to a preferred embodiment of the present invention.
Figure 2:
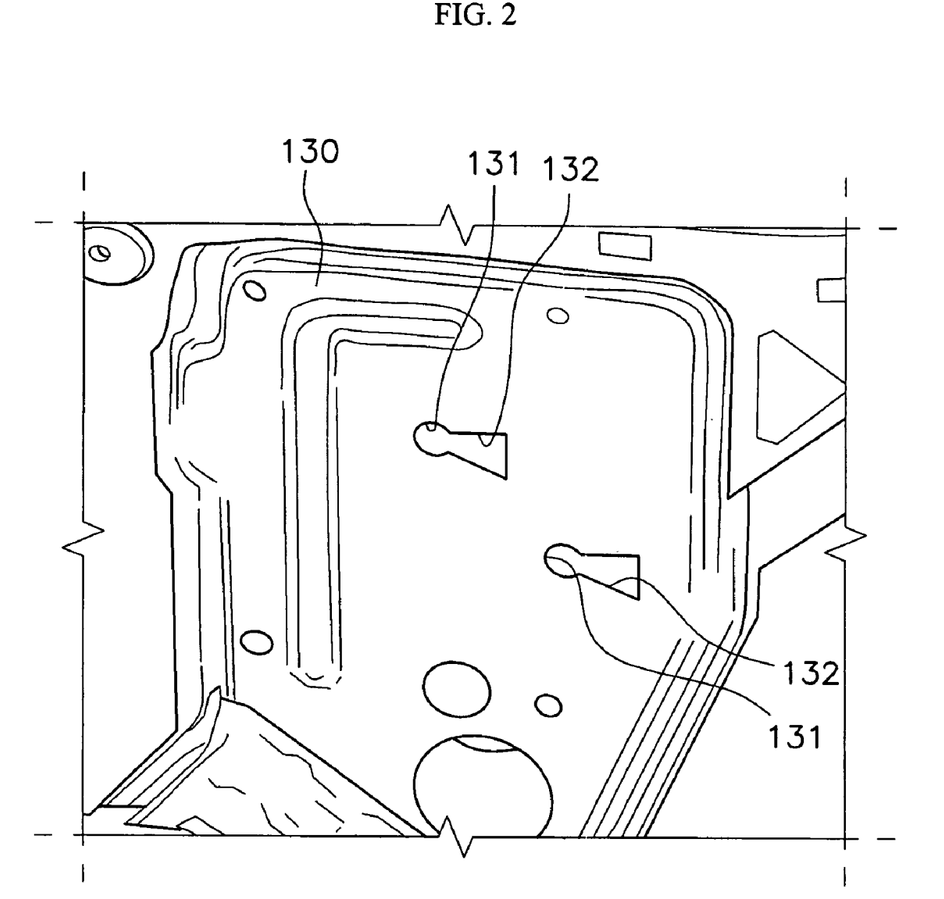
FIG. 2 is an enlarged view showing a portion of a left vertical member according to the preferred embodiment of the present invention.
Figure 3:
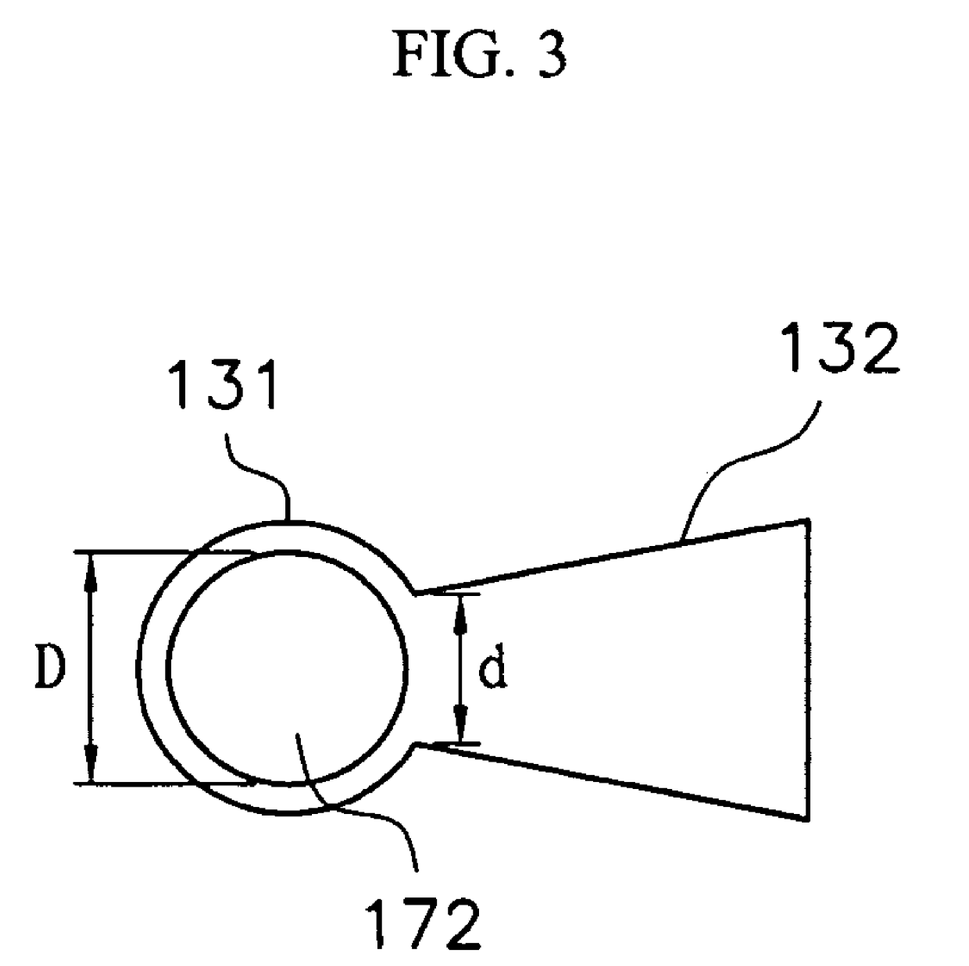
FIG. 3 is a view showing the shape of a bolt-fastening hole of the front end module carrier according to the preferred embodiment of the present invention.
Figure 4:
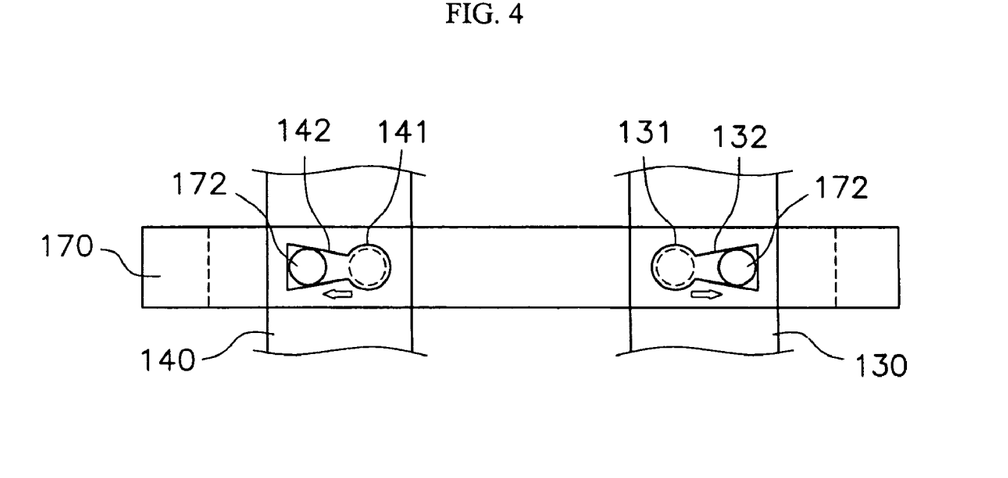
FIG. 4 is a view schematically showing a state where the front end module carrier of the present invention is subjected to head-on collision.

FIGS. 1 to 4 are views showing a front end module carrier according to a preferred embodiment of the present invention. FIG. 1 is a perspective view showing the front end module carrier according to the preferred embodiment of the present invention, FIG. 2 is an enlarged view showing a portion of a left vertical member according to the preferred embodiment of the present invention, FIG. 3 is a view showing the shape of a bolt-fastening hole of the front end module carrier according to the preferred embodiment of the present invention, and FIG. 4 is a view schematically showing a state where the front end module carrier of the present invention is subjected to head-on collision.

As shown in FIG. 1, the carrier 100 comprises an upper horizontal member 110 for supporting an upper portion of the carrier; a lower horizontal member 120 for supporting a lower portion of the carrier; and left and right vertical members 130 and 140 for supporting left and right portions of the upper and lower horizontal members 110 and 120.

A central vertical member 150 may be further provided at the centers of the upper and lower horizontal members 110 and 120 to prevent sagging of the horizontal members.

The upper and lower horizontal members 110 and 120 and the left and right vertical members 130 and 140 form a rectangular framework that has a central space in which a cooling system including a radiator, a condenser, a fan and the like required for a vehicle is mounted.

The upper and lower horizontal members 110 and 120 and the left and right vertical members 130 and 140 can be fastened to each other by means of bolts or welding. A hybrid type front end module carrier can be assembled through an over-molding method by which the upper horizontal member and the left and right vertical members made of steel are covered with resin to be combined with one another.

The left and right vertical members 130 and 140 are provided, at respective sides thereof, with headlamp-mounting portions 160 on which headlamps can be mounted.

Meanwhile, a bumper rail 170 is provided in front of the left and right vertical members 130 and 140, and a bumper cover (not shown) is mounted in front of the bumper rail 170. The bumper rail 170 is formed to be gently curved forward so as to absorb an impact upon head-on collision of the vehicle.

Bumper stays 171 are provided at both sides of a rear end of the bumper rail 170 and are fastened through bolts to side rail members 180 as well as the left and right vertical members 130 and 140.

The side rail members 180 are provided at rear ends of the left and right vertical members 130 and 140 so that the bumper stays 171 can be fastened through the bolts thereto to support the carrier 100.

Both ends of the upper horizontal member 110 are connected to front fender reinforcement members 190.

The left and right vertical members 130 and 140 are formed with bolt-fastening holes for use in fastening the vertical members to the bumper stay 171 by means of the bolts.

Specifically, referring to FIG. 2 that is an enlarged view showing a portion of the left vertical member 130 according to the preferred embodiment of the present invention, there are shown the bolt-fastening holes formed in the left vertical member 130. Each of the bolt-fastening holes comprises a substantially circular seating hole portion 131 and a guide hole portion 132 extending from the seating hole portion 131 rightward.

The right vertical member is also formed with the bolt-fastening holes in the same manner as the left vertical member. However, the guide hole portions of the bolt-fastening holes formed in the right vertical member extend in a direction opposite to the extending direction of the guide hole portions of the bolt-fastening holes formed in the left vertical member. Two or more bolt-fastening holes may be formed according to required bolt-fastening locations.

The bolts pass through the seating hole portions 131 of the respective bolt-fastening holes in the left and right vertical members to integrally fasten the bumper stay and the side rail members to each other. The guide hole portion 132 guides an impact-absorbing direction of a bolt 172 penetrating through the seating hole portion 131 in order to absorb a lateral load applied to the bumper rail.

Referring to FIG. 3, the width d of a space connecting the seating hole portion 131 to the guide hole portion 132 is preferably smaller than the diameter D of the bolt 172 to be fastened, so that the bolt 172 is securely screwed and fixed through the seating hole portion 131 in a normal state.

Further, it is preferred that the width of the guide hole portion 132 gradually increase far away from the seating hole portion 131 so that the bolt 172, which has been disengaged from the seating hole portion 131 due to a lateral load applied to the bumper rail, can be caught by a distal end of the guide hole portion 132 without large resistance.

The process of absorbing an impact through the bumper rail of the front end module carrier constructed as above will be described below.

For the sake of better understanding, FIG. 4 simply shows only a state where the bumper rail 170 is fastened through the bolts 172 to the left and right vertical members 130 and 140 with the bolt-fastening holes 131 and 132 formed therein.

In FIG. 4, a dotted line indicates a state where an external force is not applied to the bumper rail, while a solid line indicates a state where an external force have been applied to the bumper rail and thus lateral forces have been exerted on the bolts. In the case where an external force is not applied to the bumper rail 170, the bolts 172 for connecting the bumper rail 170 to the left and right vertical members 130 and 140 are located in the seating hole portions 131 and 141.

Once the vehicle is subjected to head-on collision against an obstacle, the bumper rail 170 is pushed rearward and elastically deformed to absorb an impact. Further, a lateral displacement of the bumper rail 170 somewhat increases according to the degree of withdrawal of the bumper rail. For the sake of clarity of illustration, this displacement is exaggerated in the figure.

At this time, since the lateral force is applied to the bumper rail 170 while the bumper rail is pushed rearward, the bolts 172 confined in the seating hole portions 131 and 141 of the left and right vertical members 130 and 140 are intended to move outwardly. If the lateral force beyond a certain load is applied to the bolts 172, the left and right vertical members 130 and 140 with the seating hole portions 131 and 141 formed therein are plastically deformed and the bolts 172 then move into the guide hole portions 132 and 142.

As the bolts 172 move into the guide hole portions 132 and 142, the bumper rail 170, which has been pushed rearward and compressed by the impact resulting from the collision, is uncompressed to spread and absorb the impact generated upon collision of the bumper rail 170.

In the mounting structure for the bumper rail of the front end module carrier of the present invention described above, the bolts move from the seating hole portions to the guide hole portions of the bolt-fastening holes in the left and right vertical members according to the amount of the impact applied to the bumper rail, thereby more effectively absorbing the external impact.

In the mounting structure for the bumper rail of the front end module carrier of the present invention described above, each of the bolt-fastening holes of the vertical members of the carrier, which allows the bumper rail to be fastened by means of the bolts, comprises the seating hole portion for receiving and confining the bolt therein and the guide hole portion for spreading a load applied to the bolt, so that the load applied to the bumper rail can be more effectively absorbed.

Further, since the load applied to the carrier can be spread, it is possible to minimize damage to the carrier upon collision of the carrier, thereby improving maintenance capability and serviceability.

Particularly, in case of a hybrid type front end module carrier, there is an advantage in that it is possible to minimize damage to resin binding portions which may be caused by the weakness of assembly rigidity.

What is claimed is:

1. A mounting structure for a bumper rail of a front end module carrier for a vehicle, comprising:
    an upper horizontal member that supports an upper portion of the carrier;
    a lower horizontal member that supports a lower portion of the carrier;
    left and right vertical members that connect respective left and right sides of the upper and lower horizontal members to each other to support side portions of the carrier, the left and right vertical members being formed with fastening holes; and
    a bumper rail formed to be convexly curved forward and fixedly fastened to side rail members located at rear ends of the left and right vertical members by bolts through the fastening holes,
    wherein each of the fastening holes comprises a seating hole portion that receives and connects the bolt therein and a guide hole portion laterally extending from the seating hole portion,
    wherein the guide hole portion is formed to have a generally trapezoidal shape, and the bumper rail is configured such that, when a collision of the bumper rail takes place, the bumper rail is compressed by the collision and then uncompressed to spread and absorb an impact on the bumper rail by moving the bolt into the guide hole portion, and
    wherein the width of a space connecting the seating hole portion to the guide hole portion is smaller than the diameter of the bolt, and the width of the guide hole portion gradually and continuously increases away from the seating hole portion.

* * * * *